April 27, 1965
A. S. OLEXSON ETAL
3,180,035
PIGGYBACK POCKET LEVEL
Filed March 22, 1962
3 Sheets-Sheet 1
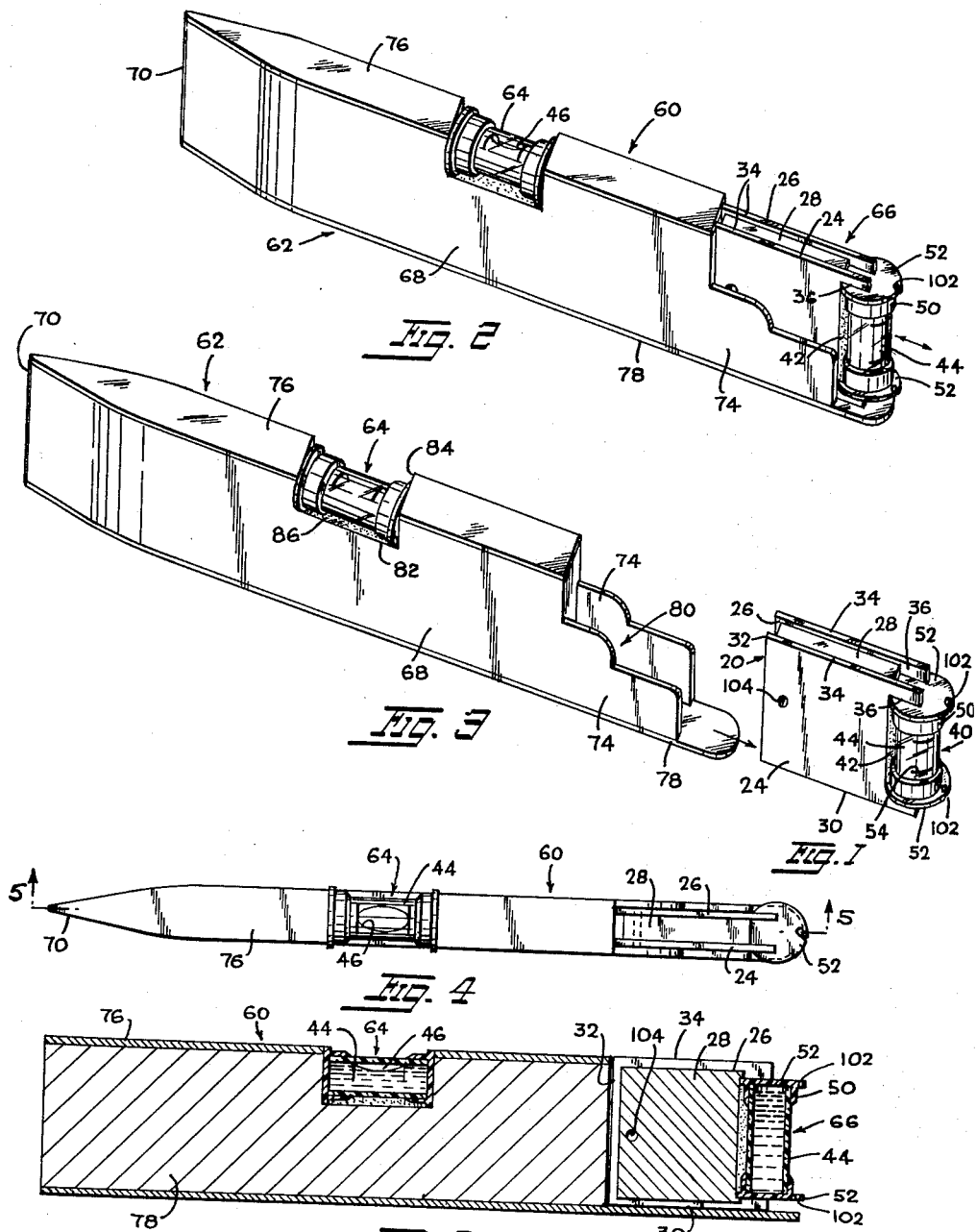
INVENTORS
ANDREW S. OLEXSON
EUGENE P. OLEXSON
BY
ATTORNEY

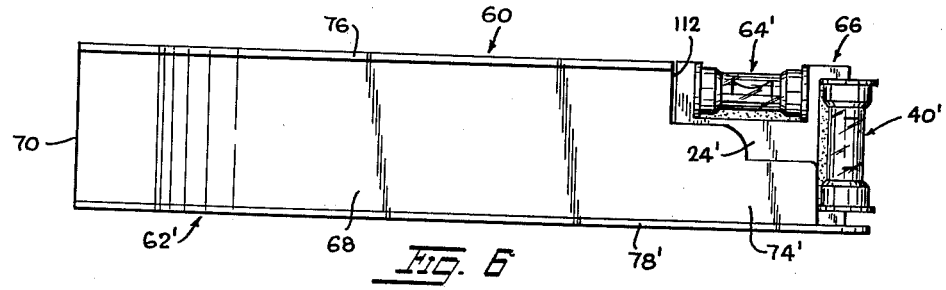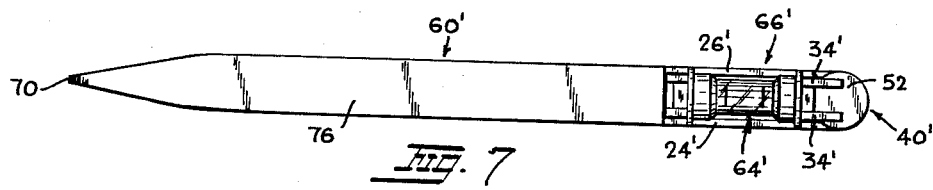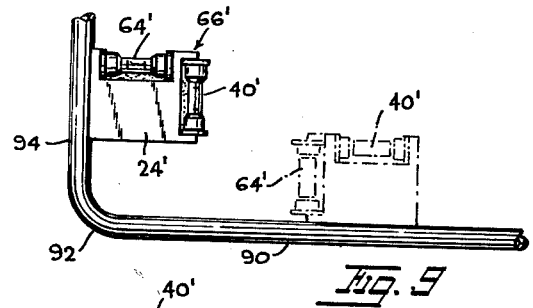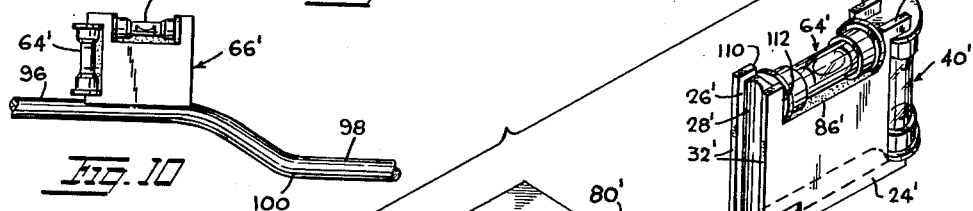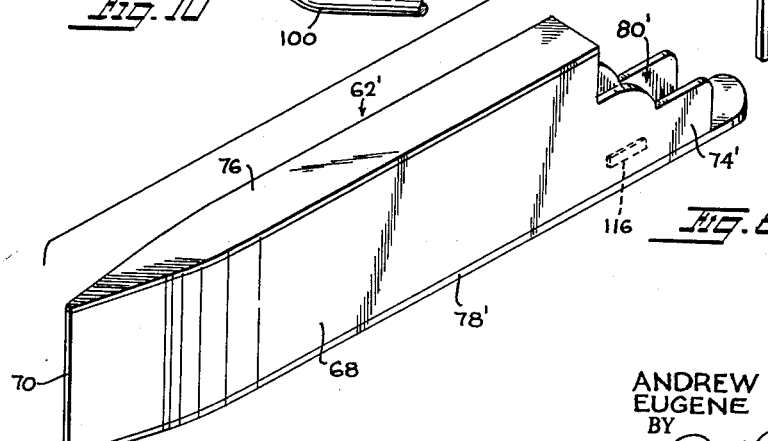

April 27, 1965

A. S. OLEXSON ETAL 3,180,035

PIGGYBACK POCKET LEVEL

Filed March 22, 1962

INVENTORS
ANDREW S. OLEXSON
EUGENE P. OLEXSON
BY

ATTORNEY

United States Patent Office 3,180,035
Patented Apr. 27, 1965

3,180,035
PIGGYBACK POCKET LEVEL
Andrew S. Olexson, Cokesbury Road, Lebanon, N.J., and Eugene P. Olexson, Roselle, N.J. (458 3rd Ave., Garwood, N.J.)
Filed Mar. 22, 1962, Ser. No. 181,576
4 Claims. (Cl. 33—207)

This invention relates to piggyback pocket levels and more specifically to leveling devices or instruments and elements thereof, and more particularly to a device of this kind wherein one or more boxed spirit levels are employed to position, ascertain or check the degree of levelness or plumbness of surfaces or objects.

A principal object of the present invention is to provide a spirit leveling and plumbing device that employs magnetic means for removably attaching the device or assembly to a metallic part of a tool or workpiece whereby the operation of positioning the tool or workpiece is facilitated as to labor and time.

Another object of the invention is to provide a device of this kind that is light in weight and strong and is arranged and constructed for most effective use and easy handling.

A further object of the invention is to provide a device of this kind whereby accurate, precise reading of levelness or plumbness is facilitated.

Yet another object is to provide a device or assembly of this kind with level indicating means which may be effectively used in both vertical and horizontal planes, overhead or below eye level.

Still another object is to provide a device of this kind with a base structure capable of being held stable when checking the plumbness.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side perspective view of a spirit leveling, attaching and plumbing device made in accordance with one form of the invention.

FIG. 2 is a side perspective view of a spirit leveling, attaching and plumbing assembly embodying a modified form of the invention.

FIG. 3 is a view similar to FIG. 2 showing the leveling attaching unit in disassembled conditon.

FIG. 4 is a top plan view of FIG. 2.

FIG. 5 is a central vertical sectional view taken on the line 5—5 of FIG. 4.

FIG. 6 is a side elevational view of a spirit leveling, attaching and plumbing assembly embodying another modified form of the invention.

FIG. 7 is a top plan view thereof.

FIG. 8 is a spread perspective view of the assembly of FIG. 6.

FIG. 9 is a side elevational view on a reduced scale of a spirit leveling, attaching and plumbing unit shown in FIG. 6 removed from the assembly and applied to a pipe for checking the plumbness thereof, the normal position of the unit being shown in dotted lines.

FIG. 10 is a view similar to FIG. 9 showing the leveling, attaching and plumbing unit applied to a pipe.

Figure 11:
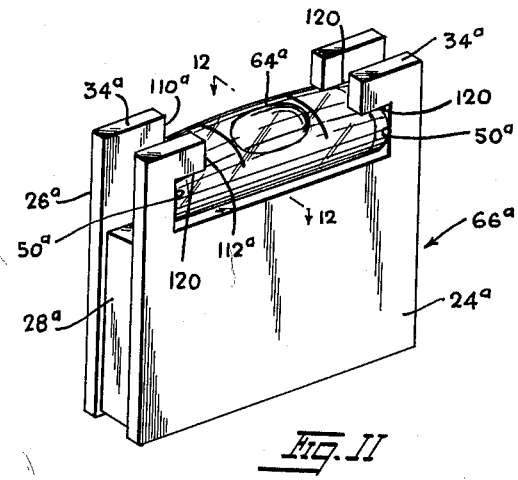
FIG. 11 is a perspective view of a spirit leveling assembly embodying another modified form of the invention.

Referring in detail to the drawings, in FIG. 1 a spirit leveling, attaching and plumbing assembly made in accordance with one form of the invention is illustrated and designated generally by the reference numeral 20. The assembly 20 comprises a rectangular-shaped block 22 consisting of a pair of closely spaced plates 24 and 26 of magnetizable metal between which and in contact therewith there is interposed a permanent magnet 28. The edges of the plates protrude slightly beyond and outwardly of the edges of the magnet. These edges of the plates are flat, straight and smooth providing checking faces 30, 30, 32, 32 and 34, 34, on three sides of the plates. These faces may be made by machining, grinding and polishing. The remaining ends of the plates are formed with cutout portions 36. The plates constitute the poles of the magnet. The inside corners of the edges of the plates are preferably slightly curved as indicated at 38 to conform to the curvature of the surface of a tool or workpiece.

A spirit level 40 is positioned in the cutout portions 36 and is secured in position by adhesive 42. The spirit level 40 is of the bubble type wherein movement of the device in any position brings a response by the bubble which is positively discernible in the face of the level. The level comprises a casing having a thin transparent hollow cylindrical body 44. Sealed within the body by well-known procedure is a fluid such as alcohol. The alcohol fills the body except for a minute space to provide the usual air bubble 46 (see FIG. 2) for indicating the levelness, plumbness or other desired position. The ends of the body are sealed by plastic caps 50 having annular flanges 52 therearound. The face or front of the body is provided with spaced centering marks or lines 54.

In FIGS. 2 to 5, inclusive, a modification of the invention is illustrated in the form of a spirit leveling, attaching and plumbing assembly 60. In this form of the invention, a base structure 62 is provided for supporting a fixed spirit level 64 and for carrying a removable spirit leveling, attaching and plumbing unit 66, similar to unit 20, in piggyback fashion.

The base structure 62 comprises a body 68 composed of an elongated thick substantially rectangular-shaped plate of light weight metal, for example, aluminum. One end of the body is tapered, coming to a blunt point as indicated at 70. The other end of the body is cut away forming side wings 74, 74 which extend midway the height of the body at the inner end thereof and lower, at the outer end.

A thin plate 76 of nonmagnetizable or nonferrous metal is welded to the top of the body as viewed in FIG. 2, the plate extending from end to end of the solid portion of the body. A plate 78 of magnetizable or ferrous metal is welded or the like to the bottom surface of the body as viewed in FIG. 2. The plate 78 extends from the pointed end of the body to and beyond the outer ends of the wings 74, 74. The wings 74, 74, the adjacent end of the body and the plate 78 define a socket portion 80 open at the top and rear.

Midway the ends of the body 68 at the top thereof, the material of the body is cut away as indicated at 82, and the top plate 76 is also cut away as indicated at 84, in alignment with the cut away portion 82 of the body. The spirit level 64, similar in construction to the spirit level 40 of FIG. 1 is mounted in the cut away portions in a horizontal position and is secured therein by adhesive 86. The spirit level is disposed flush or below the top surface of plate 76.

The spirit leveling, attaching and plumbing unit 66 is removably mounted in the socket portion 80 of the body in "piggyback" fashion. The unit 66 may be slid into the socket portion from the right as viewed in FIG. 5, or may be inserted downwardly through the open top.

The leveling, attaching and plumbing unit 66 is similar in construction to the leveling, attaching and plumbing unit 20 shown in FIG. 1 and is similarly numbered. The unit 66 differs in that the flanges 52 of the spirit level 40 are formed with notches 102 to suspend the unit from a cord (not shown) strung horizontally between supports to convert the unit to a line level. The unit 66 also is formed with a hole or passage 104 which extends through the plates 24 and 26 and the magnet 28. The hole 104 adapts the unit for serving as a device for checking the plumbness by inserting a flexible member such as a cord therethrough with a plumb bob at the end thereof. The unit can also be used as a stud finder and to hold blueprints.

In using this form of the invention, the plate 78 of the base structure 62 is placed on the surface to be checked and the spirit level 64 will indicate the degree of levelness thereof.

The unit 66 is held against accidental removal and displacement by means of the magnetic field set up by the pole plates 24 and 26 of the magnet 28 and the magnetizable plate 78. The unit 66 may be easily manually slid out of the socket portion 80 and when removed is used in a manner similar to the use of the spirit leveling and attaching unit 20.

In FIGS. 6 to 8, inclusive, a spirit leveling, attaching and plumbing assembly 60' embodying another form of the invention is shown. The assembly 60' differs from the assembly 60 of FIGS. 2 to 5, inclusive, in that the fixed spirit level 64 is omitted from the base structure 62' and instead is carried by the spirit leveling and attaching unit 66'. In unit 66', the plates 24' and 26' and the magnet 28' are formed with aligned cutout portions 110 and 112, respectively, in the top of the block as viewed in FIGS. 6 and 7, thereby interrupting the faces 34', 34' of the plates but not interfering with said faces for checking purposes. A spirit level 64' is disposed in the cutout portions and secured therein by adhesive 86'. The spirit level is disposed below the faces 34', 34'. In all other respects, the unit 66' is similar in construction to unit 66, carrying spirit level 40' of similar construction to spirit level 40 in the same fashion. The unit 66' is adapted to be housed in the socket portion 80' of the base structure 62' similarly to unit 66, but in sliding the unit into the socket portion the unit is guided to proper position therein by a keyway or groove 114 formed in plate 26' intersecting the edge thereof opposite the cutout edge mounting spirit level 40' coacting with a key block 116 secured horizontally on the inner surface of the adjacent wing 74' of the base structure. When the unit 66' is in final position in the socket portion, the interlock between the key block and keyway aids the interaction between the pole plates 24' and 26' of the magnet 28' and the magnetizable plate 78' in preventing accidental removal of the unit 66'.

In using the spirit leveling, attaching and plumbing unit 20 of FIG. 1, the necessary pair of checking faces of edges 30, 30, 32, 32 or 34, 34 is placed on the horizontal ferrous surface of the tool or workpiece to be checked so that the spirit level 40 is disposed in a horizontal plane. When the unit is in this position, the degree of levelness will be indicated by the bubble in the spirit level.

When checking the plumbness of a vertically disposed ferrous surface, the checking faces of either the pair of edges 34, 34 or the pair of edges 30, 30 are placed against the vertical surface so that the spirit level 40 is horizontally disposed whereby the bubble will indicate the degree of plumbness.

The spirit leveling, attaching and plumbing assembly 60 shown in FIGS. 2 to 5, inclusive, can be utilized by placing the base structure 62 on a horizontal surface to be checked and watching the bubble in the spirit level 64 fixed in the top of the base structure which will indicate the degree of levelness.

The unit 66 carried by the base structure may be used by removing same from the socket portion 80 of the structure and then using the unit similarly to the use of the unit 20 of FIG. 1.

The unit 66 may also be used for indicating plumbness by inserting one end of a cord through the passage 104 in the plates 24 and 26 and magnet 28 and securing the same therein and fastening a plumb bob on the other end of the cord as will be understood.

In using the spirit leveling, attaching and plumbing assembly 60' shown in FIGS. 6 to 8, inclusive, the spirit level 64' is adapted to indicate the degree of levelness when the base structure 62' is placed on a horizontal surface to be checked. By removing the unit 66' from the socket portion 80' of the base structure 62', the unit may be used for checking the leveness of a tool or workpiece of ferrous metal by mounting the checking faces of the plates 24' and 26' thereon. When the checking faces of the edges 32', 32' are placed on a horizontal surface, the spirit level 40' will be horizontal and used for checking. When the checking faces of the edges 30', 30' are placed on a horizontal surface, the spirit level 64' will be horizontal and used for checking. When the checking faces of the edges 32', 32' are placed against a vertical surface, the spirit level 64' will be horizontal and used, and when the checking faces of the edges 34', 34' are placed against a vertical surface, the spirit level 40' will be horizontal and used. When the checking faces of the edges 30', 30' are placed against a vertical surface, the spirit level 40' will be horizontal and used.

In FIG. 9, the spirit leveling, attaching and plumbing unit 66' is shown in use in checking the plumbness of a bent pipe 90 of ferrous metal, during the bending operation. In using the unit for this purpose, the checking faces of one side of the unit is placed on the reach of pipe to be bent, which reach of pipe is normally horizontally disposed. The unit is placed beyond or to the left of the point of bendure, for instance as indicated at 92. Now assuming that the unit 66' shown in dotted lines is at the left of said point instead of at the right as shown, the checking faces of the edges at one side of the unit, for example, the checking faces of the edges 32', 32' are placed on the horizontally disposed reach of the pipe to be bent so that the spirit level 64' will be vertically disposed and the spirit level 40' will be horizontally disposed as shown in dotted lines. Upon bending the pipe upwardly or vertically at right angles to the horizontal portion of the pipe, the unit 66', which is adhering to the pipe during this bending opertaion by means of the magnetic forces, will be carried upwardly and around with the pipe bringing the spirit level 40' to a vertical position and bringing the spirit level 64' to a horizontal position. The spirit level 64' therefore is the spirit level to watch during the operation to ascertain when the bent reach 94 of the pipe is plumb and it will be so when the bubble 46 in the spirit level 64' is centered as indicated by the marks 54.

FIG. 10 illustrates the unit 66' in use in checking the levelness of an offset reach of pipe 96 of ferrous metal disposed on a different horizontal plane from the horizontal plane of the rest of the pipe 98. The unit is placed on the horizontally disposed pipe to the left of the desired point of bend with the checking faces of one of the sides of the unit, for instance, the checking faces of the edges 32', 32' engaging the pipe so that the spirit level 64' is disposed vertically and the spirit level 40' is disposed horizontally. Upon bending the pipe slightly at the point 100, the unit which adheres to the pipe, is tilted slightly and upon leveling of the bent reach 96 to the position shown in FIG. 10, the unit 66' straightens out so that the spirit level 40' assumes its horizontal position. Accordingly, it is the spirit level 40' that needs to be watched to ascertain when the reach of pipe 96 is level as indicated by the bubble in said spirit level 40.'

It will be seen that the invention can be quickly, conveniently and accurately attached to any straight edge of a tool or other metallic workpiece in parallel relation thereto by merely pressing the unit firmly into position as aforesaid.

Figure 12:
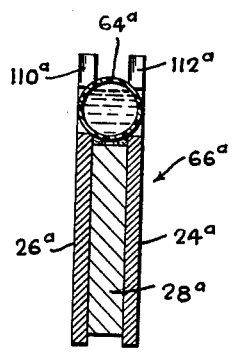
FIG. 12 is a sectional view taken on the line 12—12 of FIG. 11.

Another modified form of spirit leveling, attaching and plumbing assembly 66a is shown in FIGS. 11 and 12. The assembly 66a comprises the spaced plates 24a and 26a and the magnet 28a. The plates are formed with cutout portions 110a and 112a terminating in end undercut portions 120, 120. The cutout portions interrupt the faces 34a, 34a, of the plates but do not interfere with said faces for checking purposes. A spirit level in the form of a vial 64a is disposed in the cutout portions with its end caps 50a in the undercut portions. In this form of assembly, all of the readings are in a horizontal position.

Figure 13:
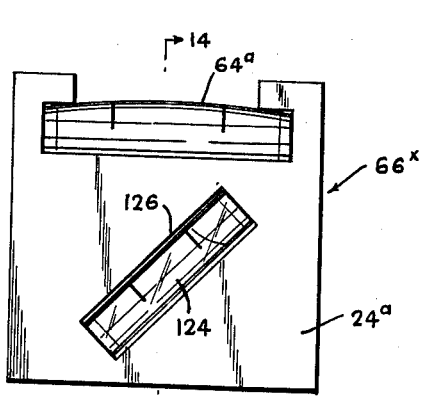
FIG. 13 is a side elevational view of a spirit leveling assembly embodying still another modified form of the invention.
Figure 14:
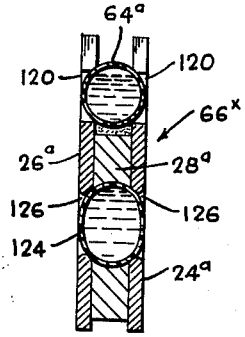
FIG. 14 is a sectional view taken on the line 14—14 of FIG. 13.

Still another modified form of spirit leveling, attaching and plumbing assembly 66x is shown in FIGS. 13 and 14. Assembly 66x differs from the assembly 66a in that another spirit level in the form of a vial 124 is mounted in aligned openings 126 formed in the plates 24a and 26a and in the magnet 28a and the opening is disposed at an angle of 45° to the horizontal as viewed in FIG. 13. The vial 124 is accordingly disposed at an angle to the horizontal and is useful at this angle for various readings.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A spirit leveling, attaching and plumbing device comprising a rectangular-shaped body composed of a pair of closely spaced rectangular plates of magnetizable metal with a permanent magnet interposed therebetween and in engagement therewith, the edges of the plates overhanging the edges of the magnet, one end of the plates being cut away, and a spirit level positioned in said cut away portion, the faces of the edges of the other end and the faces of the long edges of the plates constituting checking faces.

2. A spirit leveling, attaching and plumbing device comprising a rectangular-shaped body composed of a pair of closely spaced rectangular plates of magnetizable metal with a permanent magnet interposed therebetween and in engagement with the plates, the long and short edges of said plates overhanging the edges of the magnet, said plates constituting the poles of the magnet, one end of the plates being cut away, and a spirit level positioned in said cut away portion, the faces of the edges of the other end and the faces of the long edges of the plates constituting checking faces and adapted to position the spirit level parallel to a straight edge of a workpiece.

3. A spirit leveling, attaching and plumbing device comprising a rectangular-shaped body composed of a pair of closely spaced plates of magnetizable metal with a permanent magnet interposed therebetween and in engagement with the plates, the edges of the plates overhanging the edges of the magnet, said plates constituting the poles of the magnet, and a pair of mutually perpendicular spirit levels on two adjacent edge faces of the plates, the edge faces of the plates being magnetizable.

4. A spirit leveling, attaching and plumbing device comprising a rectangular-shaped body composed of a pair of closely spaced plates of magnetizable metal with a permanent magnet interposed therebetween and in engagement with the plates, the edges of the plates overhanging the edges of the magnet, said plates constituting the poles of the magnet, two adjacent edges of the plates having cut away portions, spirit levels in said cut away portions, the edge faces of the plates being magnetizable.

References Cited by the Examiner

UNITED STATES PATENTS

| 2,383,166 | 8/45 | Seiwell | 33—20 X |
| 2,553,668 | 5/51 | Morello | 33—207 |
| 2,607,129 | 8/52 | Updyke | 33—207 |
| 2,708,317 | 5/55 | Warne | 33—207 |
| 2,813,349 | 11/57 | Harris | 33—211 |

FOREIGN PATENTS 569,120   1/59   Canada.

ISAAC LISANN, *Primary Examiner.*